No. 820,480. PATENTED MAY 15, 1906.
E. G. DANN.
CLOSURE FOR RECEPTACLES.
APPLICATION FILED NOV. 24, 1902.
2 SHEETS—SHEET 1.
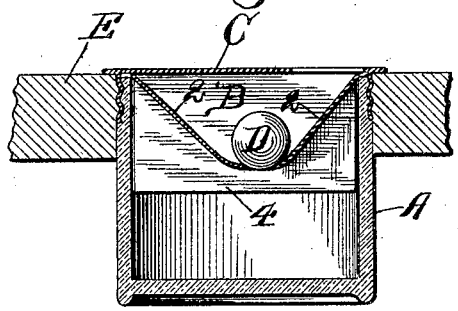
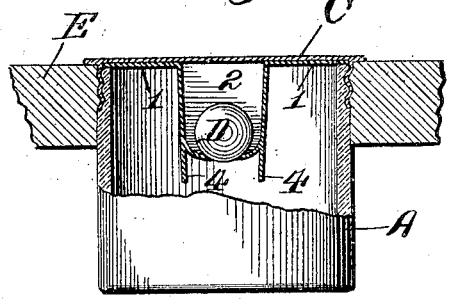
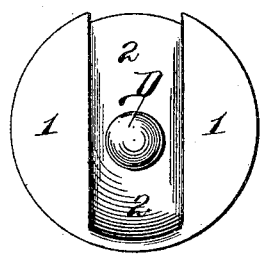
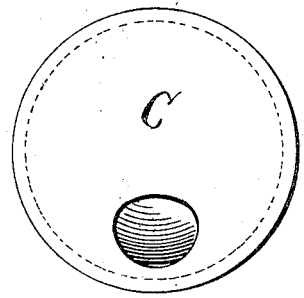
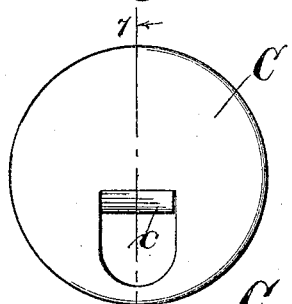
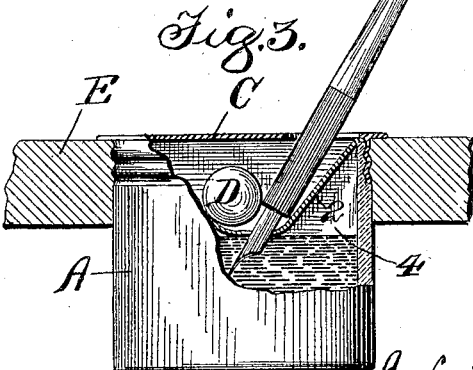
Witnesses:
J. B. Weir
Chad. D. Perry
Inventor:
Ernest G. Dann
By Raymond H. Barnett
Attys

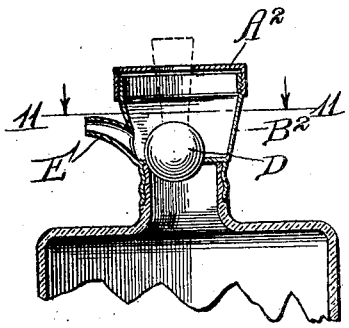
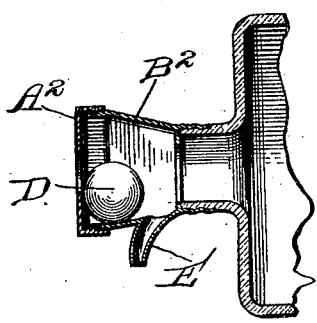
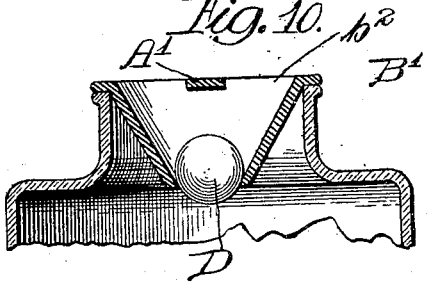
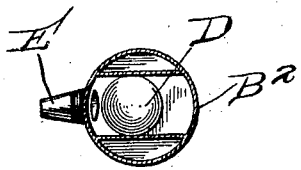
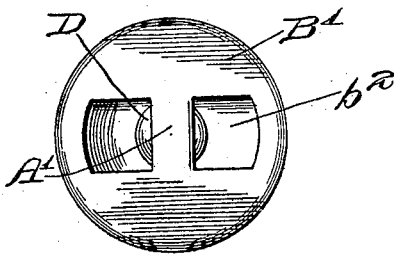

UNITED STATES PATENT OFFICE.

ERNEST G. DANN, OF CHICAGO, ILLINOIS.

CLOSURE FOR RECEPTACLES.

No. 820,480. Specification of Letters Patent. Patented May 15, 1906.

Application filed November 24, 1902. Serial No. 132,694.

*To all whom it may concern:*

Be it known that I, ERNEST G. DANN, a citizen of the United States, residing at Chicago, in the county of Cook and State of Illinois, have invented certain new and useful Improvements in Closures for Receptacles, of which the following is a specification.

My invention relates to improvements in means for automatically closing the openings to receptacles—such as ink-wells, ink-bottles, and the like—for the purpose of excluding the entrance of dust and like foreign matters, as well as to prevent the evaporation of the contents of the receptacle, although my invention may be adapted for use in closing such receptacles, so as to prevent the escape of their contents therefrom.

The primary object of my invention, however, is to provide a closure so arranged that it will in a substantially automatic manner permit access to the interior of the receptacle, such as for the purpose of dipping a pen in the ink or of pouring ink from an ink-bottle into an ink-well, and yet at the same time will instantly and automatically close the receptacle, such as when the pen is withdrawn or when the ink-bottle is again stood upright.

Another object of my invention is to provide such a closure for such receptacles as ink-wells which may be so arranged as to prevent mischievous access to the receptacle, while not at all interfering with its legitimate use.

Another object of my invention is to provide such a closure for an ink-well which shall also operate to remove surplus ink from the surface of the pen each time the pen is dipped into the ink in the well.

These and such other objects as may hereinafter appear are attained by the devices illustrated in the accompanying drawings, in which—

Figure 1 is a vertical sectional view of an ink-well sunk in a desk and provided with my improvement. Fig. 2 is a vertical view taken at right angles to Fig. 1. Fig. 3 is a view of the construction shown in Fig. 1, showing the ball in changed position. Fig. 4 is a plan view of a part of the device. Fig. 5 is a plan view of the complete well. Fig. 6 is a similar plan view to Fig. 5 of a modified form of my invention. Fig. 7 is a cross-sectional view through the cover shown in Fig. 6. Fig. 8 shows my device applied as a bottle-stopper. Fig. 9 indicates the modification shown in Fig. 8 with the parts in changed position. Fig. 10 shows another application of my device to an ink-well, and Fig. 11 is a sectional view on the line 11 of Fig. 8 looking in the direction indicated by the arrows. Fig. 12 is a plan view of Fig. 10.

Like characters of reference indicate the same parts in the several figures of the drawings.

The essence of my invention consists in providing the receptacle with an opening through which access may be had to the interior of the receptacle, the portion of the receptacle or of its cover surrounding said opening forming a seat for a spherical stopper, which is arranged to snugly close said opening, and providing guiding means for automatically returning the stopper to its seat surrounding said opening, which guiding means is also so arranged as to permit of the automatic removal of said stopper to unclose said opening either when the receptacle is tipped, as for the purpose of pouring out a portion of its contents, or when an instrument, such as a pen, is inserted in the receptacle.

In Fig. 1, A is an ink-well provided with a guide-piece B and a cover C, the guide-piece B comprising a disk-shaped top of a size to fit upon the top of the ink-well and yet to be inclosed by the cover thereof. Extending across the disk-shaped top 1 is a guide-groove 2, which extends downwardly from opposite edges of the top to the central opening 3. Depending from the disk-shaped top 1 are flanges 4. These flanges are slightly less in length than the diameter of the ink-well and serve to facilitate the placing of the guide-piece C in place.

While but one flange 4 is necessary to this end, and, in fact, the flanges 4 may be entirely dispensed with, still it is more convenient to use them, and the guide-piece can be readily manufactured with the two flanges 4, which not only serve as stops, but also form the sides to the groove 2. Arranged within the groove 2 and normally seated in the opening 3 is a metal ball D.

Preferably, for reasons which will be hereinafter explained, one side of the groove 2 slips more abruptly from the opening 3 to the top of the ink-well than does the other side.

This embodiment of my invention is assembled by placing the guide-piece B within the ink-well with the disk portion 1 resting upon the upper edge of the well, dropping the ball D into the groove 2, and screwing the top C onto the ink-well. The top C is provided with an opening at one side thereof arranged to register with that end of the groove 2 which slopes more gradually toward the opening 3.

As shown in the drawings, the ink-well A is sunk flush with the top of the desk E; but by any means which will readily suggest itself the ink-well may be so mounted within the desk that the top C cannot be readily removed therefrom. This is especially suitable for school-desks, as it prevents the pupils from removing the ink-wells from the desks and makes it more difficult for them to put foreign articles into the ink-wells.

By means of any convenient instrument which may be readily devised of wire or the like the ball D can be displaced to permit the filling of the wells with ink and as soon as released will return to its seat and will normally keep the opening 3 closed, so as to exclude the admission of dirt, dust, and the like, and also so as to prevent the evaporation of water from the ink.

The relation of the guide-groove to the opening through the cover C is such that the farther edge of the opening through the cover will serve as a stop to prevent the escape of the ball D from the guide-groove.

To use the ink-well, a pen is inserted, as shown in Fig. 3, and the inclined back thereof coming in contact with the ball D will lift the ball and force it upwardly into the side of the guide-groove farthest away from the opening through the cover, thus permitting the pen to be inserted through the opening 3 into the ink-well, the ball D resting upon the back of the pen. As the pen is withdrawn the ball D will have a tendency to remove from the back of the pen any surplus ink and will reseat itself to close the opening 3 as soon as the pen is withdrawn.

In Figs 6 and 7 I have shown a modification of my device in which the cover 6 is provided with a lip or stop $c$, which projects downwardly into the perforation through the cover and serves as a stop for the ball, regardless of the obliquity of the guide-groove, and also serves as an additional means for removing surplus ink from the back of the pen.

In Fig. 10 I have shown an ink-well having a somewhat different form of guide-piece B' and without any cover.

To prevent the escape of the ball D from the guide-piece B', I provide a guard A', which extends across the guide-piece B' and while confining the ball D sufficiently to prevent its escape still allows it to move with sufficient freedom to unclose the opening into the ink-well when a pen is inserted.

The guide-piece B' is provided with a longitudinal runway $B^3$, having diagonally-inclined front and rear walls converging at the opening into the interior of the well, the ball D being arranged to normally seat itself to close said opening.

In Fig. 9 I have shown my invention adapted to an ink-bottle, the neck of the bottle having a cap $B^2$ screwed thereon. Said cap is provided at its bottom with an opening arranged to register with the opening through the bottle-neck and with a spout E. The ball D is normally seated within the cap $B^2$, so as to close the discharge-opening from the bottle into the cap $B^2$. The cap $B^2$ is provided with a cover or guard $A^2$, arranged to prevent the escape of the ball D from the cap $B^2$. The interior of the cap $B^2$ is provided with a longitudinal runway for the ball, as shown in Fig. 11.

When it is desired to pour ink from the bottle, the bottle is tipped, as shown in Fig. 9. The ball D automatically rolls into the cap $B^2$ and uncloses the discharge-opening and the ink passes through the spout E. Upon the bottle being again placed in upright position the ball D automatically returns to its seat and closes the discharge-opening, as before.

The cap $B^2$, with the ball D, may either be arranged to be screwed upon the necks of bottles which are corked in any ordinary manner for shipment or while in stock, or it may be arranged as shown in Fig. 9, in which event the cover $A^2$ is provided with a central opening through which is inserted a cork or plug F, which for the purposes of shipment and the like is forced tightly against the ball D and fitting snugly within the opening provided for it through the cover $A^2$ will serve to firmly hold the ball D to its seat, and so to keep the bottle permanently corked.

In Figs. 8, 9, and 10 it should be understood that two sides of the receptacle containing the ball D form vertical walls, so as to form a longitudinal runway for the ball D.

Obviously many modifications in detail will occur which may be used without departing from the spirit of my invention, and I do not confine my invention to use in connection with ink-wells or the like.

While my invention is primarily of value when used as a closure for fluid-receptacles, it will commend itself for use in any situation where it is desired to keep a receptacle constantly closed and yet readily accessible for constant use—such, for instance, as receptacles for some powders and sachets containing volatile substances, essential oils, and the like, which tend to readily evaporate when the receptacle is left open.

I claim—

1. A device of the class described, comprising a guide-piece provided with an opening, a rolling stopper arranged to normally close said opening, a longitudinal runway for guiding said stopper to a position to close said opening whenever removed therefrom, and means for confining said stopper.

2. A device of the class described, comprising a guide-piece provided with two converging walls, an opening through said guide-piece at the point of convergence of said walls, a rolling stopper arranged to normally close said opening, and means for confining said stopper within said guide-piece.

3. A device of the class described, a guide-piece comprising two converging walls and provided with an opening at the point of convergence, a ball normally closing said opening, and a guard for confining said ball within said guide-piece.

4. In a device of the class described a guide-piece provided with two converging walls arranged to form the bottom of a runway, said guide-piece being provided with an opening at the bottom of the runway, a ball arranged to roll freely within said runway, and means for confining said ball to said runway.

5. In a device of the class described, a guide-piece provided with two converging walls arranged to form the bottom of a runway, said guide-piece being provided with an opening at the bottom of the runway, a ball arranged to roll freely within said runway, and a cover arranged to fit over said guide-piece so as to confine said ball within said runway, said cover being provided with an opening arranged to register with said runway.

6. In a device of the class described, a guide-piece provided with two converging walls arranged to form the bottom of a runway, said guide-piece being provided with an opening at the bottom of the runway, a ball arranged to roll freely within said runway, and a cover arranged to fit over said guide-piece so as to confine said ball within said runway, said cover being provided with an opening arranged to register with said runway and being further provided with a downwardly-depending lip arranged at one edge of said opening.

7. A device of the class described, comprising a guide-piece provided with an opening, upwardly-extending walls arranged to provide a longitudinal runway extending upwardly in opposite directions from said opening, said runway extending upwardly in one direction from said opening at a sharper angle than in the opposite direction, a rolling stopper arranged to normally close said opening.

ERNEST G. DANN.

Witnesses
  O. R. BARNETT,
  E. SHASBERGER.